(12) United States Patent
Feuchter

(10) Patent No.: US 11,474,288 B2
(45) Date of Patent: Oct. 18, 2022

(54) LIGHT SYSTEM FOR SUPPLYING LIGHT

(71) Applicant: NKT Photonics A/S, Birkerød (DK)

(72) Inventor: Thomas Feuchter, Holte (DK)

(73) Assignee: NKT PHOTONICS A/S, Birkerod (DK)

(*) Notice: Subject to any disclaimer, the term of this patent is extended or adjusted under 35 U.S.C. 154(b) by 143 days.

(21) Appl. No.: 16/610,195

(22) PCT Filed: May 2, 2018

(86) PCT No.: PCT/DK2018/050091
§ 371 (c)(1),
(2) Date: Nov. 1, 2019

(87) PCT Pub. No.: WO2018/202270
PCT Pub. Date: Nov. 8, 2018

(65) Prior Publication Data
US 2020/0116913 A1 Apr. 16, 2020

(30) Foreign Application Priority Data
May 4, 2017 (DK) .......................... PA 2017 70308

(51) Int. Cl.
F21V 8/00 (2006.01)
F21V 9/40 (2018.01)
(Continued)

(52) U.S. Cl.
CPC .............. *G02B 6/0006* (2013.01); *F21V 9/40* (2018.02); *G02B 6/0008* (2013.01);
(Continued)

(58) Field of Classification Search
CPC ....... G02B 6/0006; G02B 6/0008; F21V 9/40; F21Y 2115/30; F21Y 2115/10; F21S 41/24; F21S 43/251; B60Q 1/0011
See application file for complete search history.

(56) References Cited

U.S. PATENT DOCUMENTS 4,297,000 A    10/1981  Fries
5,838,865 A *  11/1998  Gulick ..................... H04N 9/12
                                                              385/121
(Continued)

FOREIGN PATENT DOCUMENTS

CN    1515923 A    7/2004
CN  101477242 A    7/2009
(Continued)

OTHER PUBLICATIONS

Edmund Optics: "*Optics and optical instruments annual catalog 2014*", pp. 1, 8, 9, 80,81,82,83,432,433,434,435,436,437.
(Continued)

*Primary Examiner* — Rajarshi Chakraborty
*Assistant Examiner* — Glenn D Zimmerman
(74) *Attorney, Agent, or Firm* — Buchanan Ingersoll & Rooney P.C.

(57) ABSTRACT

A light system having a light supply arrangement, a Homogenizing Light Pipe (HLP) and a fiber bundle is disclosed. The light supply arrangement includes a light source and is arranged to supply light to an input end of the HLP. The HLP is configured for scrambling the received light and for delivering a beam of light to a common packed input end of the fiber bundle.

26 Claims, 7 Drawing Sheets

(51) Int. Cl.
| | |
|---|---|
| *F21Y 115/30* | (2016.01) |
| *F21Y 115/10* | (2016.01) |
| *F21S 41/24* | (2018.01) |
| *F21S 43/251* | (2018.01) |
| *B60Q 1/00* | (2006.01) |

(52) U.S. Cl.
CPC ............ *B60Q 1/0011* (2013.01); *F21S 41/24* (2018.01); *F21S 43/251* (2018.01); *F21Y 2115/10* (2016.08); *F21Y 2115/30* (2016.08)

(56) References Cited

U.S. PATENT DOCUMENTS

| | | | |
|---|---|---|---|
| 5,936,719 A | 8/1999 | Johnson | |
| 6,125,228 A | 9/2000 | Gong | |
| 6,862,091 B2 | 3/2005 | Johnson | |
| 7,155,106 B2* | 12/2006 | Cianciotto | G02B 6/2808 385/146 |
| 2003/0002296 A1* | 1/2003 | Steiner | G02B 6/0006 362/560 |
| 2003/0007147 A1* | 1/2003 | Johnson | G01J 3/02 356/326 |
| 2003/0215180 A1* | 11/2003 | Dimas | B29C 71/04 385/39 |
| 2005/0286123 A1* | 12/2005 | Abu-Ageel | G02B 6/136 359/443 |
| 2007/0147758 A1 | 6/2007 | Cummings | |
| 2007/0242924 A1* | 10/2007 | Cianciotto | G02B 6/00 385/133 |
| 2009/0003764 A1* | 1/2009 | Ridder | G01N 21/4795 385/14 |
| 2010/0309559 A1* | 12/2010 | Mikliaev | G02B 19/0095 359/641 |
| 2011/0119938 A1* | 5/2011 | Kildevaeld | G01C 9/24 33/292 |
| 2014/0049978 A1* | 2/2014 | Stites | G03F 7/70391 362/555 |
| 2014/0104852 A1* | 4/2014 | Duong | H01L 33/58 362/328 |
| 2016/0157730 A1* | 6/2016 | Irisawa | A61B 90/30 600/407 |
| 2016/0306270 A1* | 10/2016 | Petrov | G02B 3/0006 |
| 2017/0074476 A1* | 3/2017 | Urik | F21V 14/06 |
| 2017/0219487 A1* | 8/2017 | Hill | G01J 3/0208 |
| 2017/0276857 A1 | 9/2017 | Vandenberg et al. | |

FOREIGN PATENT DOCUMENTS

| | | | | |
|---|---|---|---|---|
| CN | 103268016 A | | 8/2013 | |
| CN | 104048214 A | | 9/2014 | |
| CN | 105700156 A | | 6/2016 | |
| EP | 0886174 A2 | * | 12/1998 | ............ G02F 1/365 |
| EP | 3046152 A1 | * | 7/2016 | ............ F21S 8/061 |
| JP | 2010025558 A | * | 2/2010 | |
| WO | 0146734 A1 | | 6/2001 | |

OTHER PUBLICATIONS

International Search Report (PCT/ISA/210) dated Aug. 8, 2018, by the Nordic Patent Institute as the International Searching Authority for International Application No. PCT/DK2018/050091.

Written Opinion (PCT/ISA/237) dated Aug. 6, 2018, by the Nordic Patent Institute as the International Searching Authority for International Application No. PCT/DK2018/050091.

Extended European Search Report dated Dec. 17, 2020, issued by the European Patent Office in corresponding European Application No. 18795074.6-1230, (7 pages).

Abildgaard O."Broadband optical characterization of material properties". DTU Compute PHD-2014; No. 334). DOI: 10.11581/DTU:00000009).

Office Action (Notification of the First Office Action) dated Feb. 23, 2021 by the State Intellectual Property Office of People's Republic of China in corresponding Chinese Patent Application No. 201880036464.4, and an English Translation of the Office Action. (33 pages).

Office Action (First Office Action) dated Feb. 23, 2021, by the China National Intellectual Property Administration in corresponding Chinese Patent Application No. 201880036464.4, and an English Translation of the Office Action. (30 pages).

Office Action (Notification of the First Office Action) dated Aug. 3, 2021, by the China National Intellectual Property Administration in corresponding Chinese Patent Application No. 201880036464.4, (16 pages).

Office Action (Communication pursuant to Article 94(3) EPC) dated Apr. 25, 2022, by the European Patent Office in corresponding European Application No. 18 795 074.6-1020. (9 pages).

\* cited by examiner

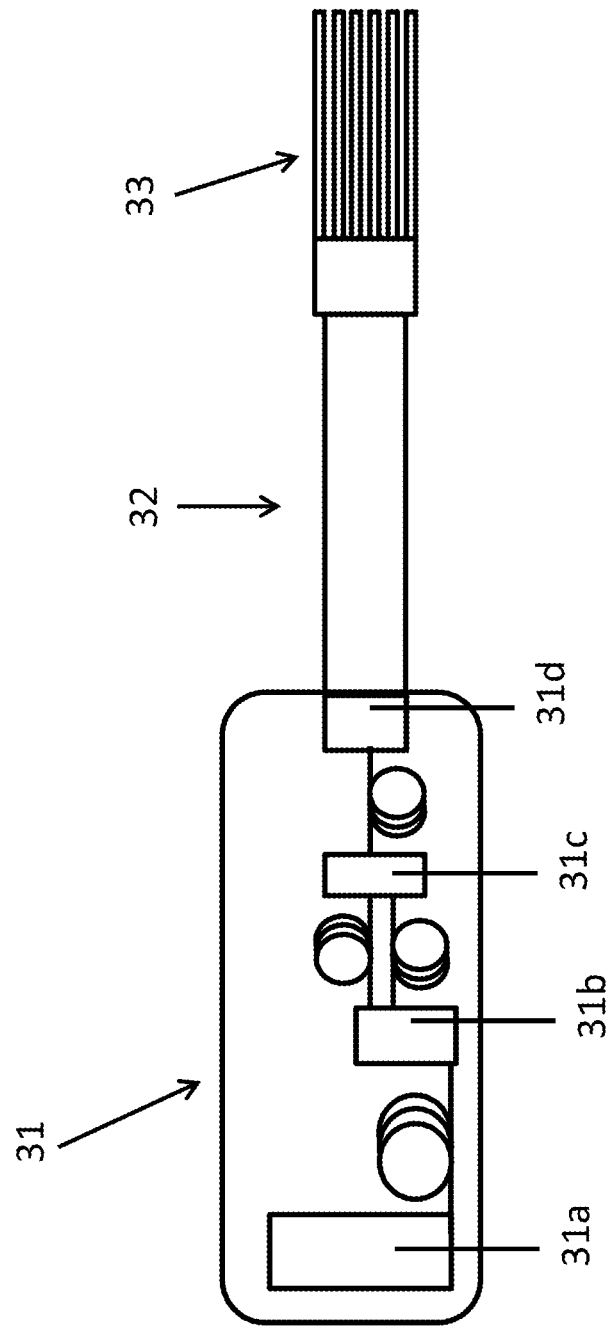

LIGHT SYSTEM FOR SUPPLYING LIGHT

TECHNICAL FIELD

The invention relates to a light system for supplying light via a plurality of optical fibers, preferably to a plurality of spatially discrete sites, for example, for illumination and/or sensing purposes.

BACKGROUND OF THE INVENTION

In many optical systems it is desired that beams of light may be supplied at several sites simultaneously and/or at a desired output configuration. Supplying light at several sites may, for example, be provided by employing a light source for each site of delivery of the light. This benefits the system in the event of damage by limiting the damage of one light source to affecting only one site of delivery and allowing other light sources to continue supply light to other sites of delivery. However, generally such a light delivery system is inefficient and may be rather inflexible and costly.

Combiners and splitters are well known in the art and generally comprise N×M ports. See, for example, the splitters and combiners marketed by OZ optics. Generally, a light splitter is a device that distributes light from an input to two or more outputs. Using a splitter, light from one light source may be split and supplied to more than one site. In many applications, there is a desire for the input light to be distributed evenly among the two or more outputs, and hence at the sites. Light splitters exist in configurations in which light from an input is split between two outputs, an input and four outputs, an input and eight outputs, and so forth. As is the case with many optical and/or photonic components and devices including light splitters, there is a constant need to reduce the size and the cost of the splitter while maintaining performance.

It has been found that prior art splitters may pass certain modes (such as transverse electric, transverse magnetic, transverse electro-magnetic, and hybrids) more effectively in some branches of the splitter than in others. The unequal propagation of certain modes may bring about undesired light intensity variations and/or mode-dependent power variations at outputs.

U.S. Pat. No. 5,936,719 describes an apparatus and method for simultaneously testing a plurality of optical fibers, preferably using optical time domain reflectometry, wherein the apparatus includes a light source for providing a pulse of light, at least one splitter means positioned for receiving the pulse of light and for splitting the pulse of light into at least two substantially identical pulses of light, and a plurality of coupling means, each connected to one of the optical fibers under test and each positioned for receiving one of substantially identical pulses of light and directing that pulse of light into an optical fiber. In one preferred embodiment, a single laser pulse source provides identical stimuli pulses to four separate fibers simultaneously by having the laser pulse pass through a single beam splitter and then through two parallel beam splitters. The two outputs from each of the parallel beam splitters are then passed to four individual couplers which are associated with individual fibers under test. Alternatively, the splitter splits the input beam into N beams. The practical limit of N is determined by the power of the input laser. Thus it is desired to have a sufficiently large input power.

U.S. Pat. No. 6,125,228 describes a hybrid space-wavelength multiplexing and demultiplexing apparatus for increasing the bandwidth for beam splitting. The apparatus uses a light-pipe for generating a number of virtual images (n−1). An image lens is arranged at the exit of the light pipe and a real image that consists of n spots will be formed in the image plane by the imaging lens. The n spots may then pass into N output fibers to establish a 1-to-n power split.

US2003/0002296 describes a light supply system for supplying light to a liquid crystal display with minimal thickness, wherein light from an arch lamp is collected via mirrors and transmissions lines, the light is homogenized and via a fiber optic cable and a collimator the light is transferred to a turn-the corner prism for redirecting the light.

SUMMARY OF THE INVENTION

The invention aims at providing a new solution for efficient splitting of light. In an embodiment, it is an object of the present invention to provide a light system suitable for supplying light via a plurality of optical fibers with relatively low or even no light intensity variations at the respective fiber outputs.

In an embodiment, it is an object to provide a light system suitable for supplying light to a plurality of spatially discrete sites. In an embodiment it is an object to provide a light system, which may deliver light with high efficiency to a number N of spatially discrete sites.

In an embodiment, it is an object to provide a light system which may deliver light with low loss to spatially discrete sites and wherein the system preferably is very flexible and wherein a uniform and/or selected amount of light may be delivered at the respective discrete N sites.

In an embodiment, it is an object to provide a light system which may deliver light with a relative high power at N discrete sites e.g. for illumination and/or for sensing purposes.

One or more of these and other objects may be solved by the various embodiments of the invention as defined in the claims and/or as described herein below.

It has been found that the invention or embodiments thereof have a number of additional advantages, which will be clear to the skilled person from the following description.

Thus, it has been found that an effective light distribution may be provided where light is supplied to a Homogenizing Light Pipe (HLP) and from the HLP to a bundle of fibers thereby ensuring that light intensity variations between the respective fiber outputs of the bundle are very low.

The solution of the invention has been found to be very cost effective and may be provided to have a very low loss of light.

The light is advantageously delivered directly from the HLP to the bundle of fibers i.e. without any intermediate beam shaping or beam filtering conditioner. The light system of the invention comprises a light supply arrangement, a HLP and a fiber bundle. In an embodiment the light supply arrangement comprises a light source and is arranged to supply light to an input end of the HLP, the HLP being configured for scrambling the received light and for delivering a beam of light to a common packed input end of the fiber bundle.

The phrase "common packed input end" is used to designate the input ends of the fibers in the fiber bundle arranged in a bundle where they are packed to be adjacent to each other and optionally fused to each other.

In an embodiment each fiber of the fiber bundle advantageously retain its core and cladding in the entire length of the respective fiber to ensure a very low loss transmission of light.

The terms "supplying light" and "feeding light" are used interchangeably.

The term "light" means at least one beam of light and may include two or more beams of light. The phrase "beam of light" and "light beam" are used interchangeably.

A light beam is a ray or shaft of light. The light beams referred to herein may have a cross sectional area which may be very small e.g. 1 µm or less and up to 200 times the exit aperture of the HLP. A light beam will usually be emitted, projected and/or propagating from a single unit, such as an optical fiber or a HLP. The light beam may be guided or unguided.

Unless otherwise specified or clear from the context, the term "substantially" means that ordinary measurement uncertainties, or ordinary product variances and tolerances are comprised.

The term "light intensity" means herein a radiometric quantity, measured in watts per meter squared (W/m$^2$) or mW/µm$^2$. The terms power of light and light intensity are used interchangeably unless otherwise specified or clear from the context.

As used herein, the term "Homogenizing Light Pipe" or "HLP" means an elongated rod or tube capable of propagating light and of homogenizing the intensity distribution of the propagated light. In an embodiment the HLP is configured for creating a more uniform light distribution of light propagated from it input end to its output end. The HPL comprises a light-guiding region comprising a transparent medium with cross-sectional dimensions greater than the wavelength(s) of the guided light. The propagation of the light through the pipe may be sufficiently accurately described using geometric, ray-optic techniques. A skilled person in the art would readily understand that typically a light pipe differs in that regard from a typical single-mode fiber optic component, the operation of which cannot be fully described in terms of ray optics but requires a precise wave-optics approach. An HLP may be formed by appropriately shaping a dielectric medium (e.g., forming a polygonal glass rod), or by providing a tubular wall with a reflective inner surface, which defines the light-guiding region and which typically has an appropriate rotationally asymmetric (i.e., non-circular) cross-section that scrambles and thus homogenizes the light irradiance.

The term "scrambling" is used to designate that the light is homogenized with respect to light intensity and the homogenizing is obtained through multiple reflections off the boundary or boundaries of the HLP.

It should be emphasized that the term "comprises/comprising" when used herein is to be interpreted as an open term, i.e. it should be taken to specify the presence of specifically stated feature(s), such as element(s), unit(s), integer(s), step(s), component(s), and combination(s) thereof, but does not preclude the presence or addition of one or more other stated features.

Throughout the description or claims, the singular encompasses the plural unless otherwise specified or required by the context.

The terms "core" and "core region" are used interchangeably and the terms "cladding" and "cladding region" are used interchangeably.

The "an embodiment" should be interpreted to include examples of the invention comprising the feature(s) of the mentioned embodiment.

All features of the invention and embodiments of the invention as described herein including ranges and preferred ranges may be combined in various ways within the scope of the invention, unless there are specific reasons not to combine such features.

The light supply arrangement may be any kind of light arrangement configured for delivering light to the input end of the HLP. Advantageously the at least one light source of the light supply arrangement is a laser light source, such as a single mode laser light source or a multimode light source. In an embodiment the light source is a few-moded laser light source.

In an embodiment, the light source is configured for generating a light beam with a first beam $M^2$ factor and the light beam delivered to the common packed input end of said fiber bundle has a second beam $M^2$ factor, wherein the second beam $M^2$ factor is larger than the first beam $M^2$ factor, such as at least about 10% larger, such as at least about 50% larger, such as at least about 100% larger or even at least about 500% larger.

The $M^2$ factor, also called beam quality factor or beam propagation factor, is a common measure of the beam quality of a laser beam. The beam $M^2$ factor may be determined according to ISO Standard 11146. Thus it has been found that by lowering the beam quality (increasing the beam $M^2$ factor) of the light source of the light supply arrangement, the light intensity may be more homogeneous and thus a uniform power of light may be distributed to the various fibers of the fiber bundle.

In an embodiment, the light supply arrangement comprises a light source selected from a fiber laser, a laser light diode (LED), a solid-state laser, a semiconductor laser or any combinations thereof. In an embodiment, the light supply arrangement comprises one single light source.

The light supply arrangement comprises at least one light source, but it should be understood that the light supply arrangement may comprise as many light sources as desired e.g. an array of LEDs. In an embodiment, the light supply arrangement optionally comprises two or more laser light sources.

To ensure an effective supply of high quality light it may be desired that the light source comprises a fiber laser. The light may be delivered directly from the fiber laser to the HLP or optionally via a beam expander.

The light source may be narrow banded e.g. spanning up to about 50 nm or broad banded, e.g. spanning above 50 nm. In an embodiment, the light supply arrangement comprises a light source spanning over at least about 100 nm, such as at least about 500 nm, such as a supercontinuum light source. The light source may advantageously be spanning at least one octave.

The bandwidth or span of a light source is determined to include wavelengths with a spectral intensity of at least about 10 µW/nm.

The light from the light source may be pulsed or it may be a continuous light beam.

The light supply arrangement may comprise one or more additional optical elements, such as one or more optical filters, one or more amplifiers and/or one or more beam shaping elements. These one or more optical elements may advantageously form part of one or more beam conditioner.

The term "beam conditioner" is herein used to designate a unit or an arrangement of units which is configured for modifying the shape and/or spectral property/properties of a light beam.

In an embodiment, the light supply arrangement comprises an optical filter, such as an absorbing glass filter, an interference-based filter with a dielectric coating, a grating, a Fabry-Perot interferometer, a prism based filter, a band-pass filter, a notch filter and/or any combinations thereof. The light supply arrangement may comprise two or more optical filters.

In an embodiment, the light supply arrangement comprises a wavelength filter, such as a band pass filter e.g. an AOTF (acousto-optic tunable filter), the wavelength filter preferably being wavelength tunable. In an embodiment the AOTF is configured for filtering off two or more wavelength ranges from an input light beam. The light supply arrangement may comprise two or more wavelength filters.

Where the light source is a broadband light source, it is in particular desired to have a wavelength filter.

In an embodiment, the light supply arrangement comprises a wavelength combiner, such as a Wavelength Division Multiplexer (WDM). In an embodiment, optionally the wavelength combiner is configured for combining light from one or more wavelength filters and/or unfiltered light from one or more light sources.

A wavelength combiner is also sometimes referred to as a spectral beam combiner or an incoherent beam combiner and is configured for combining beams comprising different wavelengths.

In an embodiment, the wavelength combiner is configured for combining two or more high-power laser beams so as to obtain a single beam not only with correspondingly higher power but also with more or less preserved beam quality and thus with increased brightness (power).

In an embodiment, the wavelength combiner is configured for combining two or more beams with non-overlapping optical wavelength spectra, preferably ensuring that the wavelengths propagate in the same direction.

In an embodiment, the wavelength combiner is arranged to receive and combine light from two different light sources, such as from two or more diodes, such as from an array of diodes.

In an embodiment, the wavelength combiner is arranged to receive and combine light beams having non-overlapping wavelength spectra, such as light beams from different light sources.

In an embodiment, the wavelength combiner is arranged to receive and combine beams from one or more wavelength filters, such as from one wavelength filter arranged to filter light from a supercontinuum light source. For example, the wavelength combiner may be arranged to receive and combine beams with different (e.g. non overlapping) wavelength spectra, where the beams are beams from a filtered supercontinuum light source.

For example, the light supply arrangement may comprise a supercontinuum light source and a first filter filtering off a light beam having a first wavelength range and a second filter filtering off a second light beam having second wavelength range and the light supply arrangement comprises a combiner arranged for combining the first and the second light beams.

The various combinations of light sources and/or filters which may form part of the light supply arrangement ensure a high flexibility of the light system. In particular the combination of a broadband light source and one or more wavelength filters and an optional wavelength combiner is advantageous because the light system may be configured for delivering light having a desired and selected wavelength spectrum, optionally for use for scanning through the spectrum e.g. for use in a sensing apparatus.

The light supply arrangement may be configured for supplying the light to the input end of the HLP directly from the light source, directly from the wavelength filter or directly from the wavelength combiner. To ensure an effective homogenization of the light in the HLP it is desired that the light from the light supply arrangement is supplied such that it will be reflected at a reflecting boundary in the HLP, preferably several times along the length of the HLP.

The light supplied from the light supply arrangement is advantageously supplied with an angle larger than zero, preferably larger than about 10 degrees relative to the HLP axis at its input end and up to the acceptance angle of the HLP.

The light supplied from the light supply arrangement is advantageously supplied to the HLP with an angle up to the acceptance angle of major number of the optical fibers of the fiber bundle, such as preferably at least 95% of the fibers, such as all of the fibers of the fiber bundle. The sine of that full acceptance angle is called the numerical aperture.

The angle of the supplied light is the ray angle. The supplied light, e.g. a light beam, may have one ray angle or a plurality of ray angles, e.g. for a diverging beam, advantageously at least about 50%, such as at least about 80%, such as at least about 90% of the light power has ray angle below the acceptance angle of the HLP and preferably also up to the acceptance angle of major number of the optical fibers of the fiber bundle.

The light supplied from the light supply arrangement may be supplied as a single light beam or as two or more light beams.

In an embodiment the light supplied from the light supply arrangement is supplied as a single light beam or as two or more light beams.

The acceptance angle is the maximum angle of a ray (relative to the axis of the HLP) hitting the entrance aperture of the HLP which allows the incident light to be propagated in the HLP.

The light supply arrangement may supply the light in the form of one single light beam or in the form of two or more light beams e.g. having different angles to the HLP axis at its input end and which are intermixed in the HLP.

In an embodiment, the light supply arrangement comprises an output fiber arranged for delivering the light to the input end of the HLP. The output fiber may preferably have a numerical aperture (NA) of at least about 0.15, such as at least about 0.2, such as at least about 0.3, such as at least about 0.4, such as at least about 0.5. The larger the NA at the input, the shorter the HLP may be while still ensuring an effective homogenization of the light power in the HLP.

In an embodiment, the light supply arrangement is arranged relative to the input end of the HLP to provide that a light beam supplied from the light supply arrangement is diverging to increase the beam diameter. By supplying the light beam as a diverging light beam, rays of the light beam have different angles relative to the HLP axis at its input end. The diverging light beam may advantageously be supplied to provide that the HLP is essentially filled at the entrance aperture or up to a short distance, such as up to about 1 cm, such as up to about 0.5 cm into the HLP, for example to provide that rays at the periphery of the diverging beam is incident on the reflecting boundary of the HLP at the entrance aperture or up to a short distance, such as up to about 1 cm, such as up to about 0.5 cm into the HLP.

In an embodiment, the light supply arrangement is arranged relative to the input end of the HLP to provide that a light beam supplied from the light supply arrangement is diverging to increase the beam diameter to have a beam diameter at the input end of the HLP which is at least about 10% of an entrance aperture diameter of the HLP, such as at least about 10% of an entrance aperture diameter of the HLP.

The light may e.g. be supplied from the light supply arrangement with free space converging of the supplied beam.

Advantageously, the light supply arrangement is arranged relative to the input end of the HLP to provide that the light from the light supply arrangement is diverging to at least about 50% of the entrance aperture diameter of the HLP, such as at least 75% of the entrance aperture diameter of the HLP, such as least about 90% of the entrance aperture diameter of the HLP.

In an embodiment, the light supply arrangement comprises at least one beam conditioner arranged for conditioning the light prior to supplying it to the input end of the HLP.

In an embodiment, the light supply arrangement comprises a beam conditioner arranged for beam shaping the light prior to supplying it to the input end of the HLP. The beam shaping element of the beam conditioner may for example comprise a diffuser, diverging lens, a piano-concave lens and/or a micro lens array.

In an embodiment, the beam shaping element of the beam conditioner comprises a gradient index lens (GRIN), such as a GRIN lens having NA of about 0.5 or more. The GRIN lens advantageously has a cylindrical shape with a length of at least about 1 mm, such as from about 1.5 to about 4 mm. The GRIN lens advantageously has a pitch of about 0.25 or about 0.5.

In an embodiment, the beam conditioner is arranged for conditioning the light for delivery to the HLP. The beam conditioner is advantageously arranged to deliver the light to the input end of the HLP to provide that the light is delivered as a diverging light beam e.g. to provide that the HLP is essentially filled at the entrance aperture or up to a short distance, such as up to about 1 cm, such as up to about 0.5 cm into the HLP, for example to provide that rays at the periphery of the diverging beam is incident on the reflecting boundary of the HLP at the entrance aperture or up to a short distance, such as up to about 1 cm, such as up to about 0.5 cm into the HLP.

In an embodiment, the beam conditioner is arranged to deliver the light to the input end of the HLP to provide that the light at the input end of the HLP has a beam diameter which is at least about 10% of an entrance aperture diameter, such as at least about 20% of an entrance aperture diameter of the HLP, such as at least about 50% of the entrance aperture diameter of the HLP, such as at least about 75% of the entrance aperture diameter of the HLP, such as least about 90% of the entrance aperture diameter of the HLP.

It has been found that by ensuring that the light as delivered at the input end of the HLP has a relatively large beam diameter relative to the HPL entrance aperture diameter, e.g. as exemplified above, a very effective intensity uniformity may be obtained at the output end of the HLP, while simultaneously the HPL may be relatively short, e.g. with a length of 5 cm or shorter.

In an embodiment, the beam conditioner is arranged for free space delivery to the HLP. In an embodiment the beam conditioner is coupled, e.g. butt coupled and/or spliced to the HLP.

The HLP generally is an elongated rod or tube. Preferably, the HLP has at least one reflecting boundary having an entrance aperture diameter, an exit aperture diameter, and preferably with a cross sectional rotationally asymmetrical shape of the reflecting boundary. The reflecting boundary preferably has a cross-sectional polygonal shape, such as hexagonal, pentagonal, quadrangular or triangular. The aperture diameters are determined at the largest cross sectional dimension of respectively the entrance aperture and the exit aperture. The rod is advantageously configured for guiding light by total internal reflection.

The phrase "cross sectional rotationally asymmetrical shape" means that the reflecting boundary is not fully rotationally symmetrical, for example in that it is non-circular, and does not have rotational symmetry with respect to any angle of rotation. Thus the reflecting boundary may have discrete rotational symmetry, such as 4-folds, 5-fold, 6-fold, 7-fold or even higher fold rotational symmetry.

Advantageously, the reflecting boundary is shaped as a regular polygon with one or more, e.g. all, of its sides and angles equal.

In an embodiment, the HLP comprises a rod of material capable of propagating at least a portion of the light supplied from the light supply arrangement. In this embodiment, it is desired that the outer face provides the reflecting boundary or the reflecting boundary may be integrated in the rod, e.g. by providing a rod core with polygonal shape, coating the outer surface and applying a layer onto part or all of the coating.

The rod may e.g. be of polymer or glass. Preferably, the rod is a glass rod, such as a silica rod. The rod may advantageously be coated with a reflective coating, such as a metallic coating.

Examples of suitable rod HLPs, which may be used in the light system, are the light pipes marketed by Edmund Optics Inc. USA.

In an embodiment, the HLP comprises a hollow tubular body with an inner reflective surface. The inner reflective surface preferably has a cross-sectional rotationally asymmetrical shape. In this embodiment, the inner reflective surface preferably provides the reflecting boundary.

The hollow tubular body may for example, comprise a glass body, a metal body, a ceramic body, or any combinations thereof. Advantageously, the body comprises a reflective coating to provide the inner reflective surface.

In an embodiment, the hollow tubular body comprises a glass body and the inner reflective surface of the glass body is reflective for a fraction of light and an outer face of the glass body is reflective for another fraction of light. The HLP may in an embodiment be as the light integrator described in US 2007/0147758.

In an embodiment, the HLP may be tapered. In an embodiment, the HLP may be substantially straight, e.g. having a substantially straight center axis. In an embodiment, the HLP may be bent.

The HLP advantageously has an entrance aperture with a minimal cross-sectional dimension of at least about 0.01 mm, such as at least about 0.1 mm, such as from about 1 to about 20 mm. The entrance aperture may for example be circular or rotationally asymmetrical e.g. with a polygonal shape corresponding to the reflecting boundary of the HLP.

In an embodiment, the HLP has an exit aperture with a minimal cross-sectional dimension of at least about 0.01 mm, such as at least about 0.1 mm, such as from about 1 to about 20 mm.

The entrance aperture and the exit aperture may be equal or different from each other. In an embodiment, the HLP has an exit aperture, which is larger than its entrance aperture, such as at least about 10% larger in diameter, such as at least about 50% larger in diameter.

In an embodiment, the cross sectional minimum diameter or the reflecting boundary of the HLP is increasing in at least a length section of the HLP from close to the entrance aperture to further from the entrance aperture, thereby the light intensity homogenization may be very effective and may require a shorter HLP length.

The HLP advantageously has a length of at least about 2 cm, such as from about 2.5 to about 30 cm.

In an embodiment, the HLP has a length which is sufficient to reach a light intensity uniformity of at least about 75%, such as of at least about 80%, such as of at least about 90%, wherein the light uniformity is determined as the light uniformity of a cross-sectional area of the light comprising at least about 90% of the total power of the light at the exit aperture and with an area resolution of at least about 5%, such as at least about 1% of the cross-sectional area of the light comprising the at least about 90% of the total power and wherein the X % intensity uniformity is about 100% minus the percentage in difference between the highest light intensity and the lowest light intensity relative to the highest intensity.

For example, if the resolution is about 5% the cross-sectional area of the light comprising at least about 90% of the total power of the light at the exit aperture is divided into 20 segments each comprising about 5% and the light intensity is determined for each. The light uniformity is calculated as the ratio of the intensity in the segment having lowest intensity to the intensity in the segment having the largest intensity. For convenience, the ratio is expressed as percentage.

In an embodiment, the HLP is configured for generating a light intensity uniformity of at least about 75%, such as of at least about 80%, such as of at least about 90%, such as at least about 95%.

In an embodiment, the light system is configured for splitting light into N output sub-fiber bundles with very low mode-dependent power variations.

The HLP is advantageously essentially rigid such that it is not bending under its ordinary use.

To prevent back reflections, the HLP may have a facet at its input end and/or its output end coated with an anti-reflective coating.

In an embodiment, the HLP has at its input end and/or at its output end with an end comprises a facet comprising an anti-reflective coating.

The HLP is advantageously selected to provide that the light beam delivered from the HLP is cross-sectionally substantially power homogeneous, preferably such that the power uniformity is at least about 90%. Thereby a uniform power distribution in the fibers of the fiber bundle may be provided. The design parameters for ensuring desired power homogeneity includes as taught above one or more of the above described parameters.

In an embodiment, the light beam received by said common packed input end of said fiber bundle is cross-sectionally substantially power homogeneous and preferably the HLP is configured for supplying said light beam to the common packed input end of said fiber bundle, preferably without any intermediate optical elements, such as by a butt coupling.

In an embodiment, the distance between the HLP and the fiber bundle may be about 1 µm or larger, such as about 10 µm or larger, such as about 100 µm or larger, such as about 1 mm or larger.

Minimum distance between the HLP and the fiber bundle may be determined by the periodicity of etalon effects $L \gg \lambda^2/(\text{refractive index} * \text{free spectral range})$, where L is the roundtrip length of the cavity (which is twice the physical length of the cavity).

Free spectral range is the wavelength distance between two transmission maxima. For values of a wavelength of 400 nm and a free spectral range of 1 nm, this result in a minimum distance of ~200 µm. The upper limit is set by the reduced coupling as the light is diverging from the light pipe with the angular distribution.

Advantageously, the HLP is configured for scrambling the light from the light supply arrangement to provide that the light beam at the output end of the HLP has a substantially cross-sectional uniformity. Preferably the HLP is configured for scrambling the light from the light supply arrangement to provide that the light beam at the output end of the HLP has a uniform modal power distribution.

The fiber bundle may in principle have any number of fibers. The number and input diameter(s) of the fiber of the bundle are advantageously selected to correspond to the exit aperture of the HLP and preferably, such that the common input end of the fiber bundle corresponds to the exit aperture of the HLP. Preferably the common input end of the fiber bundle has a minimum cross sectional diameter which is at least about 75% of the exit aperture of the HLP, such as at least about 80% of the exit aperture of the HLP, such as at least about 90% of the exit aperture of the HLP, such as at least about 95% of the exit aperture of the HLP, such as about 100% of the exit aperture of the HLP.

In an embodiment, the fiber bundle has a minimum cross sectional diameter which is larger than 100% of the exit aperture of the HLP, thereby ensuring that the fiber bundle is simpler to align with the HLP exit end and/or to ensure that no light is wasted. The fibers of the fiber bundle which receives no light may be considered to be redundant fibers. The fibers at the edge of the bundle receiving less light than fibers at the middle of the bundle may at their exit end be distributed evenly among the N-branches fiber bundle.

It has been found that by providing that the fibers of the fiber bundle has core and cladding and is not constructed as a splitter the fiber bundle may have a very large number of fibers while still ensuring a low power loss of the light received from the HPL or even of the light exiting the HPL aperture.

The fiber bundle advantageously comprises at least 50 optical fibers, such as from about 100 to about 2000 optical fibers, such as from about 200 to about 1000 optical fibers.

The fibers of the fiber bundle may be identical or they may differ, e.g. comprising two or more types of optical fibers. This may be advantageous where the amount of light to be delivered to various sites should be different e.g. in case of illumination of various lamps of a vehicle.

In an embodiment, the fibers of the fiber bundle are substantially identical.

The fibers may advantageously be multimode fibers to ensure a low power loss in the fibers.

In an embodiment, the fiber bundle at its common input end has a core fill factor of at least about 0.5, such as at least about 0.6, preferably of at least about 0.7, such as about 0.8 or higher. This may be increased even further by removing all or parts of the cladding of the fibers at the bundled length section adjacent to the input end. Thereby any loss of light at the common input end of the fiber bundle may be kept very low.

In an embodiment, the fibers of the fiber bundle are bundled over a bundling length from the common input end. The fiber bundle preferably comprises an input fiber enclosure, which encloses the bundled fibers at least over a part of the bundle length.

The input fiber enclosure may e.g. be a coating of polymer or of another material. In an embodiment, the input fiber enclosure is of glass e.g. provided by a glass ring that has been collapsed onto the fiber bundle.

In an embodiment one or more of the fibers of the fiber bundle are uncoated over at least a part of the longitudinal extension of the enclosure.

In an embodiment, fibers of the fiber bundle are uncoated over at least a length section of the bundling length and the fibers may optionally be fused over at least a part of the length section of the bundling length. Thereby the core fill factor at the common input end may be very high, such as about 0.9 or even higher.

In an embodiment, the fiber bundle is unbranched.

Advantageously, the fiber bundle is an N branched fiber bundle comprising N output sub-fiber bundles, each output sub-fiber bundle comprises at least two fibers, such as at least 10 fibers, such as from 20 to 50 fibers.

The fiber bundle advantageously comprises N output sub-fiber bundles, wherein the N is at least 2, preferably at least 4, such as from 8 to 30, such as from 10 to 20.

To further ensure a desired light power distribution, the N output sub-fiber bundles advantageously have input ends spatially distributed at the common packed input end.

In an embodiment, the optical fibers of the fiber bundle are arranged such that each of the N output sub-fiber bundles comprises randomly selected fibers relative to their position at the common packed input end of said fiber bundle.

In an embodiment, the optical fibers of the fiber bundle are arranged such that each of the N output sub-fiber bundles comprises semi-randomly selected fibers relative to their position at the common packed input end of said fiber bundle such that each of the N output sub-fiber bundles comprises fibers having input ends at several radially different positions of the common packed input end of said fiber bundle.

In an embodiment, the number of fibers of one of the N branches differs from the number of fibers of another of the N branches.

In an embodiment, the N output sub-fiber bundles have same number of fibers.

BRIEF DESCRIPTION OF PREFERRED EMBODIMENTS AND ELEMENTS OF THE INVENTION

The above and/or additional objects, features and advantages of the present invention will be further elucidated by the following illustrative and non-limiting description of embodiments of the present invention, with reference to the appended drawings.

The figures are schematic and are not drawn to scale and may be simplified for clarity. Throughout, the same reference numerals are used for identical or corresponding parts.

FIG. 4 is a schematic illustration of an embodiment of a light system of the invention comprising a light supply arrangement with a broad band light source, a wavelength filter, a wavelength combiner and a beam expander.

Figure 1:
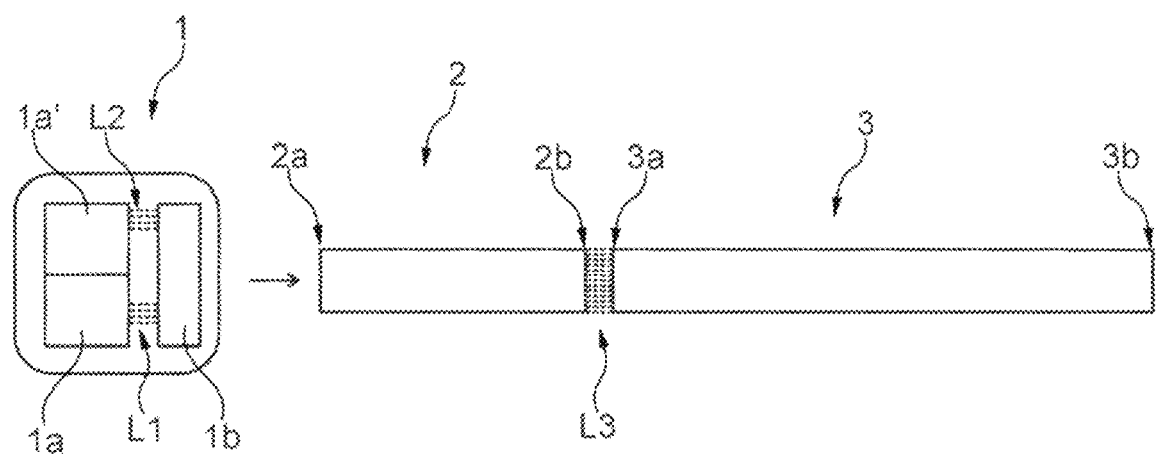
FIG. 1 is a schematic illustration of an embodiment of a light system of the invention comprising two light sources and a non-branched fiber bundle.

The light system illustrated in FIG. 1 comprises a light supply arrangement 1, a HLP 2 and a fiber bundle 3. The light supply arrangement 1 comprises two light sources 1$a$, 1$a'$ and a combiner 1$b$. The light sources 1$a$, 1$a'$ may be substantially identical or different. In an embodiment where the light sources are substantially identical the light power supplied to the HLP 2 may be increased relative to using just one light source. Preferably the two or more light sources are emitting light beams L1, L2 having different wavelength spectra. L1 and L2 are for example, independently of each other, light beams spanning up to about 50 nm, such as up to about 25 nm, such as up to about 10 nm. Preferably, L1 has peak power at a first wavelength and L2 has peak power at a second wavelength different from the first wavelength. For example, L1 may have peak power within the range of about 200 to about 600 nm and L2 may have peak power within the range about 600 to about 1100; L1 may have peak power within the range of about 400 to about 500 nm and L2 may have peak power within the range about 600 to about 800 or L1 may have peak power within the range of about 450 to about 700 nm and L2 may have peak power within the range about 800 to about 1000. Such a light system may, e.g., be used for supplying light to microscopy, e.g. to fluorescence microscopy. The light sources 1, 1$a'$ may e.g. be pulsed or non-pulsed light sources. The light beams L1, L2 are sent to the combiner 1$b$ which is advantageously a wavelength combiner e.g. as described above. From the combiner 1$b$ the light is supplied to the input end 2$a$ of the HLP 2 e.g. via free space and/or via a not shown optical fiber. In the HLP 2 the light is scrambled to increase the uniformity of the modal power distribution at the exit end 2$b$ of the HLP 2. The light L3 having the increased uniformity modal power distribution is transmitted directly to the common packed input end 3$a$ of the fiber bundle 3. As disclosed above the fiber bundle may advantageously comprise many optical fibers, such as at least 50 optical fibers. The light beam L3 supplied to the common packed input end 3$a$ is evenly distributed in the optical fibers of the fiber bundle 3 and is guided along the fibers to the exit end 3$b$ of the fibers of the fiber bundle. In this embodiment the fibers are not branched from the fiber bundle but have a common exit end. The bundled fibers may be arranged with a different configuration at the exit end 3$b$ than at the common packed input end 3$a$ of the fiber bundle 3. For example the fibers may be arranged to provide that the periphery of the fiber bundle 3 at the exit end 3$b$ has a characteristic shape, such as moon shaped, square or letter shaped e.g. for a car head light or for a light advertisement.

In a variation of the example shown in FIG. 1, the light supply arrangement has only one single light source.

Figure 2:
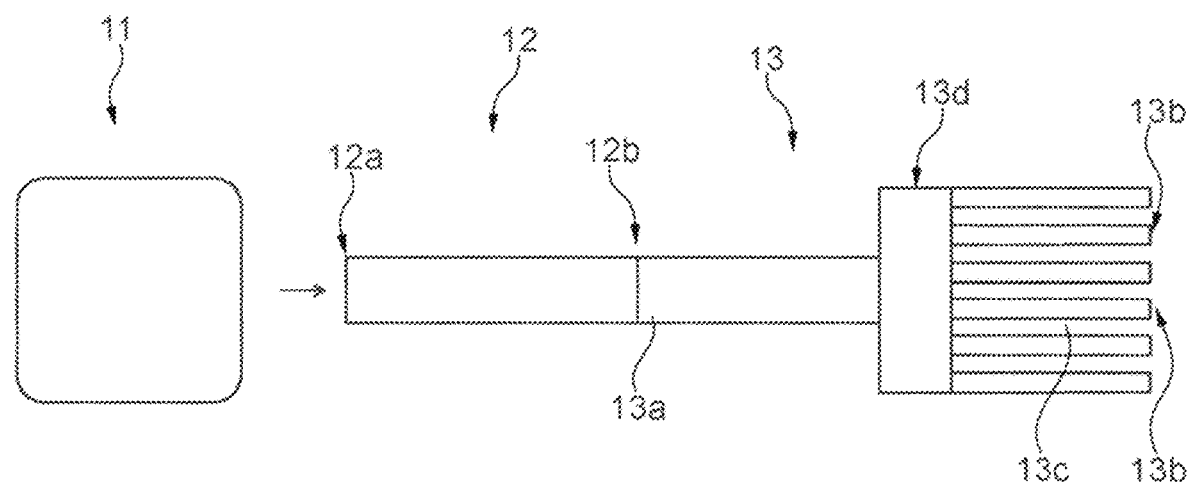
FIG. 2 is a schematic illustration of an embodiment of a light system of the invention comprising an N-branched fiber bundle.

The light system illustrated in FIG. 2 comprises a light supply arrangement 11, a HLP 12 and an N-branched fiber bundle 13. The light supply arrangement 11 may be as described above and is arranged for supplying at least one light beam to the input end 12$a$ of the HLP 12 e.g. via free space and/or via a not shown optical fiber. In the HLP 12 the light is scrambled to increase the uniformity of the modal power distribution at the exit end 12b of the HLP 12. The exit end 12b of the HLP 12 is butt coupled to the HLP 13 to ensure that the power homogenized light is transmitted directly to the common packed input end 13a of the fiber bundle 13. The N-branched fiber bundle comprises N output sub-fiber bundles 13c, each output sub-fiber bundle comprises at least two fibers, such as at least 10 fibers, such as from 20 to 50 fibers. In the shown embodiment the fiber bundle 13 comprises a branching section 13d where the N output sub-fiber bundles are branched from the bundling length section.

Figure 3:
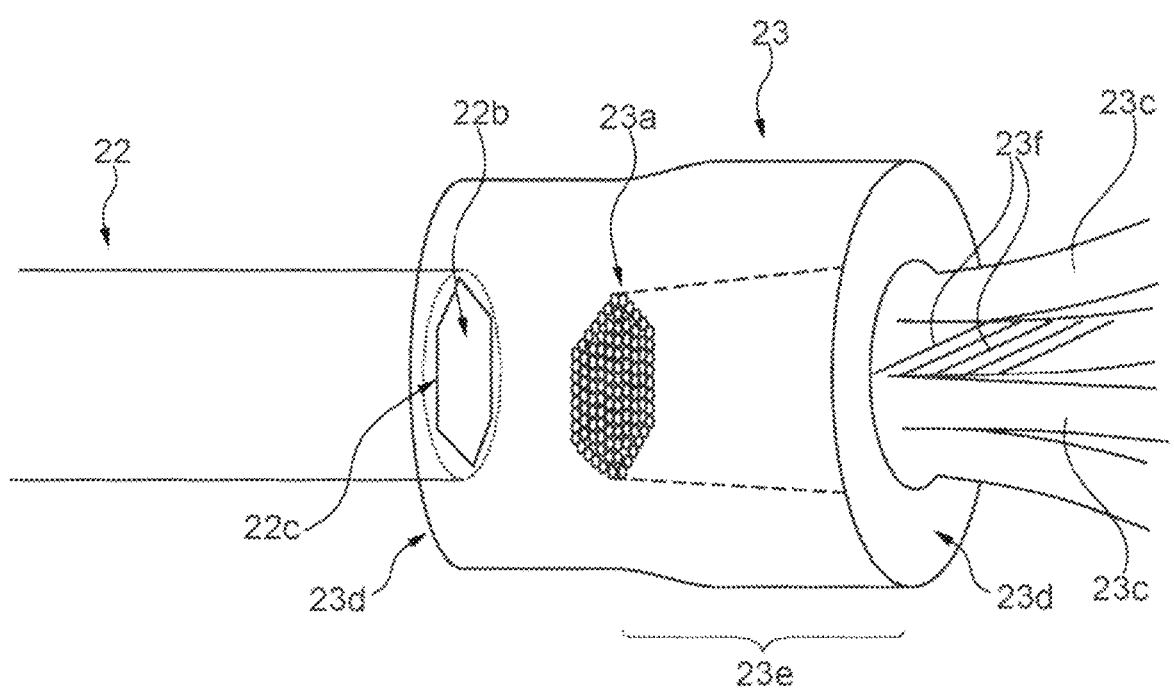
FIG. 3 is a schematic illustration of a coupling between the HLP and the fiber bundle of an embodiment of a light system of the invention.

FIG. 3 illustrates a coupling between the HLP 22 and the fiber bundle 23 of an embodiment of a light system. The HLP 22 has an exit end 22b and it can be seen that the HLP 22 has a reflecting boundary 22c with a cross-sectional polygonal shape. The fiber bundle 23 has a bundling length 23e and a common packed input end 23a shaped to have a periphery corresponding to the exit aperture of the exit end 22b of the HLP 22. In the shown embodiment the common packed input end 23a of the fiber bundle 23 is illustrated to be at a distance to the exit end 22b of the HLP 22, however, it is preferred that the common packed input end 23a of the fiber bundle 23 is butt coupled to the exit end 23b of the HLP 22. The N-branched fiber bundle 23 comprises N output sub-fiber bundles 23c. Each output sub-fiber bundle comprises a number of optical fibers 23f, which may e.g. be twisted. The fiber bundle 23 comprises an input fiber enclosure 23d, which encloses the bundled fibers over the bundle length 23e and ensures that the fibers are held firmly together. As disclosed above the fibers may be uncoated and optionally fused at the bundling length section 23e.

The light system illustrated in FIG. 4 comprises a light supply arrangement 31, a HLP 32 and an N-branched fiber bundle 33. The light supply arrangement 31 comprises a broadband light source 31a, such as a supercontinuum light source, a wavelength filter 31b, a wavelength combiner 31c and a beam expander 31d. The broadband light source 31a is fiber coupled to the wavelength filter 31b as illustrated. The wavelength filter 31, e.g. an AOTF, filters off two light beams with different wavelength spectra e.g. having wavelength spectra as described for L1 and L2 in FIG. 1 above. The filtered beams are guided, e.g. by fibers, as illustrated to the wavelength combiner 31c where they are combined and from the combiner 31c the light beam is guided to the beam expander 31d, e.g. a GRIN lens, which is directly coupled to the HLP 32 for delivering the expanded light beam. The HLP 32 and an N-branched fiber bundle 33 may be as disclosed above e.g. in FIG. 2.

In a variation of the example shown in FIG. 4 the wavelength filter 31b is replaced with two wavelength filters, each of them filtering off one of the two light beams with different wavelength spectra.

Figure 5A:
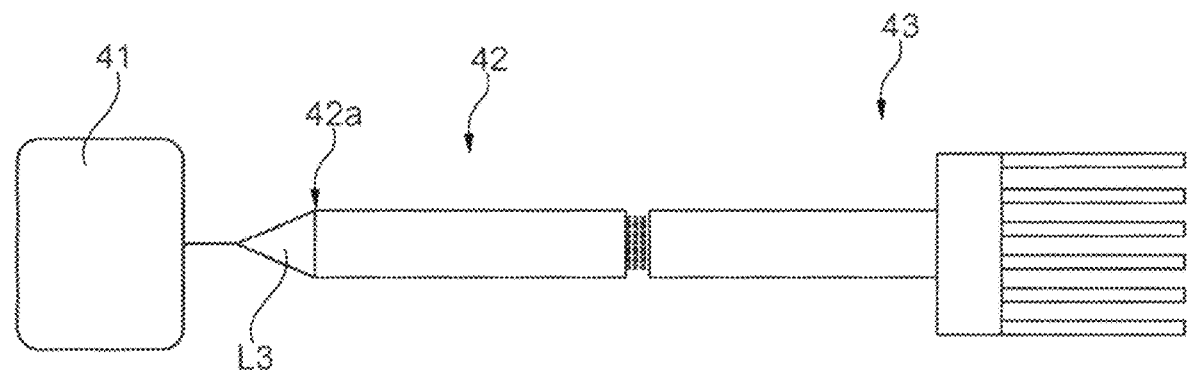
FIG. 5 is a schematic illustration of an embodiment of a light system of the invention where the light supply arrangement is arranged relative to the input end of the HLP to provide that the light from the light supply arrangement is diverging to have a relative large beam diameter at the input end of the HLP.

The light system illustrated in FIG. 5a comprises a light supply arrangement 41, a HLP 42 and an N-branched fiber bundle 43. The light supply arrangement 41 is arranged relative to the input end 42a of the HLP 42 to provide that the light beam L3 from the light supply arrangement 41 is diverging to have a relatively large beam diameter at the input end 42a of the HLP 42.

Figure 5B:
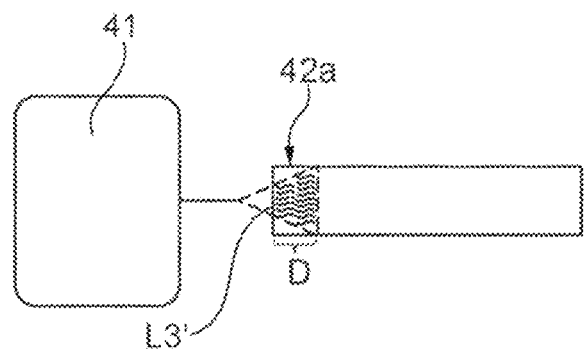

In the variation of the light system illustrated in FIG. 5a shown in FIG. 5b only the light supply arrangement 41 and the HLP 42 are shown and the light supply arrangement 41 is arranged relative to the input end 42a of the HLP 42 to provide that the light beam L3' from the light supply arrangement 41 is diverging to have a relatively large beam diameter at the input end 42a of the HLP 42 such that the beam is further diverging to impinging on the reflective boundary of the HLP a short distance D into the HLP.

Figure 6:
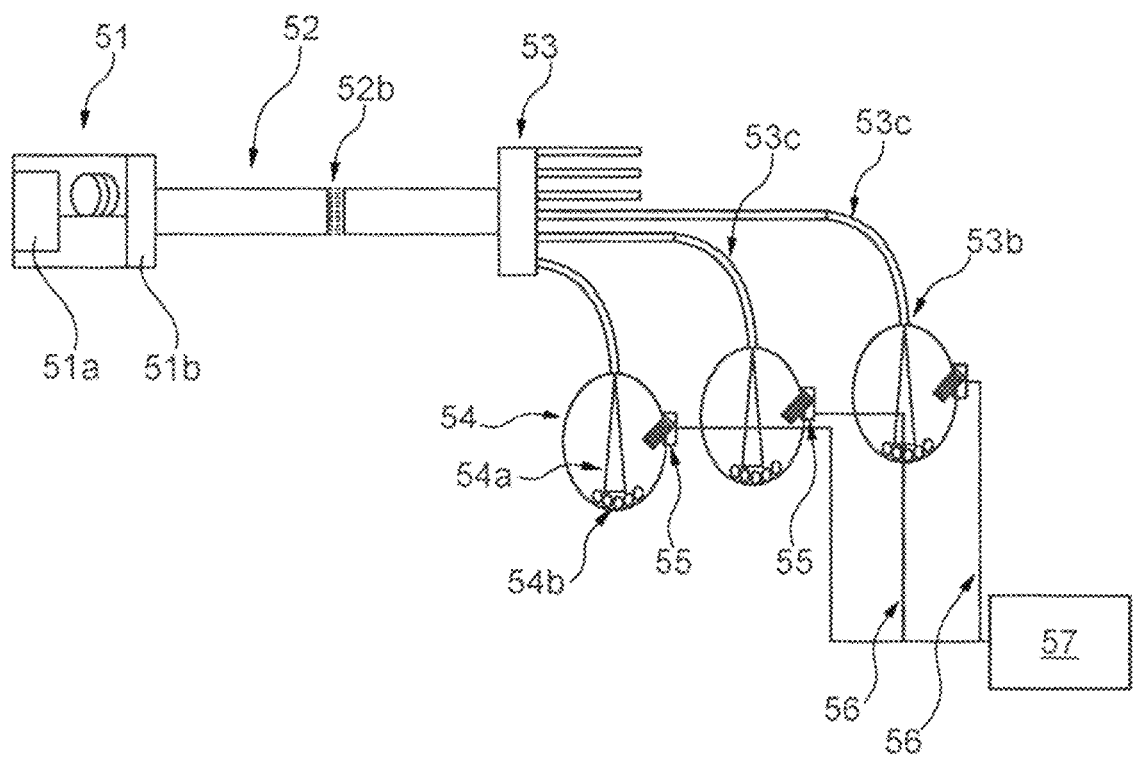
FIG. 6 is a schematic illustration of an embodiment of a light system of the invention comprising an N-branched fiber bundle configured for supplying light at spatially discrete sites for illumination and/or sensing purpose.

The light system illustrated in FIG. 6 is arranged for illumination and sensing of pellets 54b in sensing chambers 54. The light system comprises a light supply arrangement 51, a HLP 52 and an N-branched fiber bundle 53. The light supply arrangement 51 comprises a light source 51a and a beam conditioner 51b. The light source 51a supplies light e.g. pulsed light to the beam conditioner where the light optionally is filtered, combined and/or beam expanded and the final light beam or beams is/are delivered to the HLP 52. In the HLP 52 the light is scrambled by multiple reflections off the sides of the HLP to have a more uniform modal power distribution at the exit end 52b of the HLP 52 and the uniform light beam is delivered to the common packed input end of the fiber bundle 53. The light beam supplied to the common packed input end of the fiber bundle 53 is evenly distributed in the optical fibers of the fiber bundle 53 and is guided along the N sub-fiber bundles 53c to the N exit ends 53b. The N exit ends 53b are arranged for supplying light at the spatially discreetly arranged sensing chambers 54 for projecting illuminating beams 54a towards the pellets 54b for sensing one or more characteristics of the pellets, such as color, content, structure, etc.

A light sensor, such as a camera 55 is arranged in each sensing chamber 54 to image light reflected from the pellets 54b and the image data from the respective light sensors 55 are transmitted via wires 56 to a data analyzer 57. The light system may e.g. be arranged for supplying illumination for hyperspectral sensing as described in the PhD thesis by Otto Abildgaard "Broadband optical characterization of material properties". DTU Compute PHD-2014; No. 334). DOI: 10.11581/DTU:00000009.

In an embodiment, the sensing chambers 54 are pill coaters and the detector system is arranged for detecting if the coating fulfills one or more quality parameters.

Figure 7:
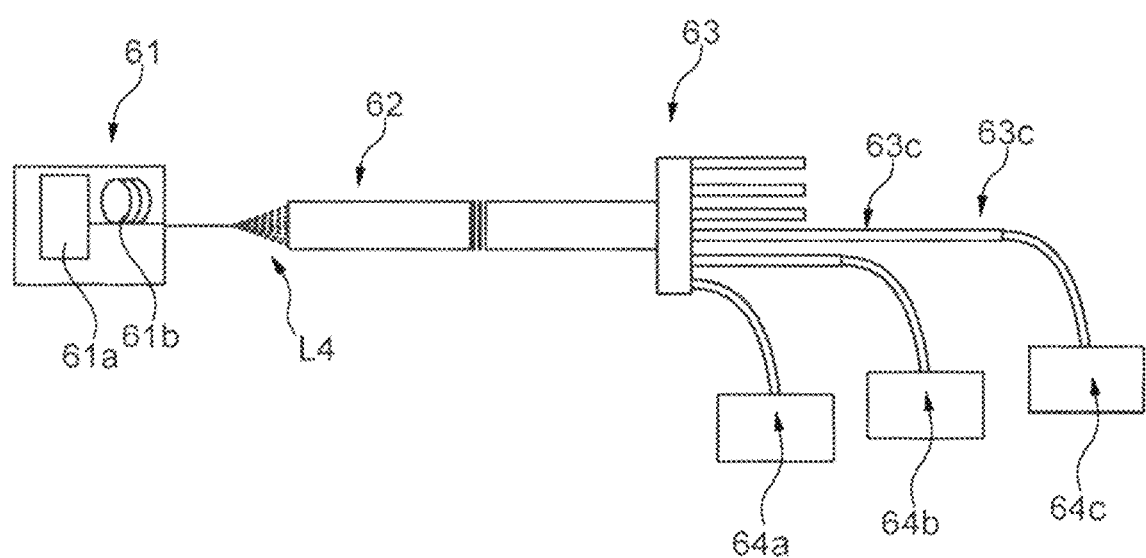
FIG. 7 is a schematic illustration of an embodiment of a light system of the invention comprising an N-branched fiber bundle configured for supplying light at spatially discrete sites for illumination.

In FIG. 7 the light system is configured for supplying light at spatially discrete sites for illumination, e.g. for vehicle lights. The light system comprises a light supply arrangement 61, a HLP 62 and an N-branched fiber bundle 63. The light supply arrangement 61 comprises a light source 61a and an optical fiber 61b projecting the light beam L4 towards the input end of the HLP 62 such that the light beam L4 is beam expanding to a beam size not larger than the entrance aperture of the HLP 62. In the HLP 62 the light is scrambled by multiple reflections off the sides of the HLP to have a more uniform modal power distribution at the exit end of the HLP 62 and the more uniform light beam is delivered to the common packed input end of the fiber bundle 63. The light beam supplied to the common packed input end of the HLP 63 is evenly distributed in the optical fibers of the fiber bundle 63 and is guided along the N sub-fiber bundles 63c to the N exit ends. The N exit ends 53b are arranged for supplying light at spatially discrete lights 64a, 64b, 64c which may e.g. include left headlight, right head light, left rear light, etc.

The invention claimed is:

1. A light system comprising a light supply arrangement, a Homogenizing Light Pipe (HLP) comprising an input end and an output end, and a fiber bundle, said light supply arrangement comprises a laser light source and is arranged to supply light to be received by the input end of said HLP, said HLP being configured for scrambling said received light such that a light beam at the output end of the HLP has a substantially cross-sectional uniformity, and said HLP being configured for delivering a beam of light to a common packed input end of said fiber bundle, wherein the light supply arrangement is arranged relative to the input end of the HLP, such that the light from the light supply arrangement is diverging to increase a beam diameter of the light such that the HLP is essentially filled by the light at a distance of up to 1 cm into the HLP from an entrance aperture of the HLP, wherein at the distance of up to 1 cm into the HLP from an entrance aperture of the HLP, the fill factor is 0.5 or more.

2. The light system of claim 1, wherein said light supply arrangement comprises a beam conditioner arranged for conditioning the light beam, said beam conditioner is arranged to deliver said light to the input end of the HLP, such that the beam diameter of the light at the input end of the HLP is larger than an entrance aperture diameter of the HLP.

3. The light system of claim 1, wherein said fiber bundle comprises at least 50 optical fibers, at least a plurality of said fibers of said fiber bundle has a core and a cladding at the common packed input end.

4. The light system of claim 1, wherein said fiber bundle is an N branched fiber bundle comprising N output sub-fiber bundles, each output sub-fiber bundle comprises at least two fibers and wherein the optical fibers of the fiber bundle are arranged such that each of the N output sub-fiber bundles comprises randomly selected fibers relative to their position at the common packed input end of said fiber.

5. The light system of claim 1, wherein said laser light source is selected from a fiber laser, a solid-state laser, a semiconductor laser or any combinations thereof.

6. The light system of claim 1, wherein said laser light source spans over at least about 100 nm.

7. The light system of claim 1, wherein said light supply arrangement comprises a wavelength filter, said wavelength filter being wavelength tunable and being configured for filtering off two or more wavelength ranges from an input light beam.

8. The light system of claim 1, wherein said light supply arrangement comprises a wavelength combiner.

9. The light system of claim 1, wherein said light supply arrangement is configured for supplying said light to the input end of the HLP directly from the laser light source, or directly from a wavelength filter, when present, or directly from a wavelength combiner, when present.

10. The light system of claim 1, wherein said light supply arrangement comprises an output fiber arranged for supplying said light to the input end of the HLP, said output fiber having a numerical aperture of at least about 0.10.

11. The light system of claim 1, wherein said HLP has a reflecting boundary with an entrance aperture diameter and a cross sectional rotationally asymmetrical shape.

12. The light system of claim 1, wherein said HLP comprises a rod of material capable of transmitting at least a portion of the light supplied from said light supply arrangement.

13. The light system of claim 1, wherein said HLP comprises a hollow tubular body with an inner reflective surface, said inner reflective surface having a cross-sectional rotationally asymmetrical shape.

14. The light system of any claim 1, wherein said entrance aperture of the HLP has a cross-sectional dimension from about 1 mm to about 20 mm.

15. The light system of claim 1, wherein the beam diameter of the light at the input end of the HLP is at least about 20% of an entrance aperture diameter of the HLP.

16. The light system of claim 1, wherein the beam diameter of the light at the input end of the HLP is at least about 50% of an entrance aperture diameter of the HLP.

17. The light system of claim 1, wherein the laser light source is configured for generating a light beam with a first beam $M^2$ factor and the HLP is configured for scrambling the light beam to increase the first beam $M^2$ factor to a second beam $M^2$ factor, larger than the first beam $M^2$ factor.

18. The light system of claim 1, wherein said HLP is configured for scrambling the light from the light supply arrangement such that the light beam at the output end of the HLP has a uniform modal power distribution.

19. The light system of claim 1, wherein said laser light source is a supercontinuum light source.

20. The light system of claim 2, wherein said beam conditioner comprises a diffuser, a diverging lens, a plano-concave lens, a gradient index lens and/or a micro lens array.

21. The light system of claim 7, wherein said light supply arrangement comprises an Acousto Optic Tunable Filter (AOTF).

22. The light system of claim 11, wherein sides or reflecting boundaries of said HLP are coated with a reflective coating.

23. The light system of claim 11, wherein said HLP is guiding light by total internal reflection.

24. The light system of claim 12, wherein said rod comprises a glass rod.

25. The light system of claim 13, wherein said hollow tubular body comprises a glass body, a metal body, a ceramic body or any combinations thereof.

26. The light system of claim 17, wherein the second beam $M^2$ factor is at least about 10% larger than the first beam $M^2$ factor.

* * * * *